United States Patent
Wildgrube et al.

(10) Patent No.: US 6,249,872 B1
(45) Date of Patent: Jun. 19, 2001

(54) METHOD AND APPARATUS FOR INCREASING SECURITY AGAINST UNAUTHORIZED WRITE ACCESS TO A PROTECTED MEMORY

(75) Inventors: Frank L. Wildgrube, Hillsboro; Mark Albrecht, Banks, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/002,776

(22) Filed: Jan. 5, 1998

Related U.S. Application Data (63) Continuation-in-part of application No. 08/598,803, filed on Feb. 9, 1996, now Pat. No. 5,835,594.

(51) Int. Cl.⁷ .................................................. G06F 12/14
(52) U.S. Cl. ............................................................ 713/200
(58) Field of Search ............................... 380/23; 713/164, 713/165, 200; 703/23, 25, 28; 365/63; 257/679; 385/60

(56) References Cited

U.S. PATENT DOCUMENTS

| | | | |
|---|---|---|---|
| 4,278,837 | 7/1981 | Best ..................................... 364/918 |
| 4,521,852 | * 6/1985 | Guttag .................................. 711/163 |
| 4,590,552 | * 5/1986 | Guttag et al. ........................ 711/163 |
| 5,022,077 | 6/1991 | Bealkowski et al. ..................... 380/4 |
| 5,103,444 | 4/1992 | Leung et al. .......................... 370/432 |
| 5,144,659 | 9/1992 | Jones ...................................... 380/4 |
| 5,175,840 | * 12/1992 | Sawase et al. ....................... 711/103 |
| 5,289,540 | 2/1994 | Jones ...................................... 380/4 |
| 5,293,424 | * 3/1994 | Holtey et al. .......................... 380/23 |
| 5,377,264 | 12/1994 | Lee et al. . |
| 5,421,006 | 5/1995 | Jablon et al. .......................... 714/36 |
| 5,432,729 | * 7/1995 | Carson et al. ......................... 365/63 |
| 5,442,704 | * 8/1995 | Holtey ................................... 380/23 |
| 5,465,299 | 11/1995 | Matsumoto et al. .................. 380/23 |
| 5,479,509 | 12/1995 | Ugon ..................................... 380/23 |
| 5,623,673 | * 4/1997 | Gephardt et al. .................... 710/260 |
| 5,657,445 | * 8/1997 | Pearce ................................... 713/200 |
| 5,729,760 | * 3/1998 | Poisner ................................... 710/3 |
| 5,731,629 | * 3/1998 | Woodward ........................... 257/679 |
| 5,764,834 | * 6/1998 | Hultermans ............................ 385/60 |
| 5,835,594 | * 11/1998 | Albrecht et al. ...................... 380/23 |

OTHER PUBLICATIONS

Microsoft Press Computer Dictionary Second Edition, 1994, pp.24,73,111,182,216,244,261 and 363.*

* cited by examiner

*Primary Examiner*—Tod Swann
*Assistant Examiner*—Matthew Smithers
(74) *Attorney, Agent, or Firm*—Blakely, Sokoloff, Taylor & Zafman LLP (57) ABSTRACT

A system and method for protecting a non-volatile storage element of an electronic system from an unauthorized write access is described. The method features the operational steps of entering a mode of operation in which an authentication process is performed, placing a security circuit of the electronic system in a first predetermined state of operation before leaving the mode of operation, checking the current state of the security circuit, and halting further operations of the electronic system if the security circuit exists in a state of operation other than the first predetermined state of operation.

15 Claims, 8 Drawing Sheets

METHOD AND APPARATUS FOR INCREASING SECURITY AGAINST UNAUTHORIZED WRITE ACCESS TO A PROTECTED MEMORY

CROSS REFERENCES TO RELATED APPLICATIONS

This is a continuation-in-part of a U.S. Patent application (application Ser. No. 08/598,803) which was filed Feb. 9,1996 now U.S. Patent 5,835,594 and is owned by Assignee of the present Application.

BACKGROUND OF THE INVENTION

1. Field of the Invention

The present invention relates to the field of computer systems. More specifically, the present invention relates to data security on computer systems.

2. Background Information

Existing methods of preventing unauthorized write access to non-volatile storage such as FLASH memory typically rely on "secret" access methods to a write enable circuit. These "secret" access methods to the write enable circuit can be reverse-engineered through the use of standard debugging hardware. Once reverse engineered, a person will be able to produce code that can write to the "protected" non-volatile storage at will. If the code is used in a malicious manner, it can be used to introduce viruses into the "protected" non-volatile storage or even destroy the content of the non-volatile storage.

Thus, it is desirable to have a more robust approach to preventing unauthorized access to non-volatile storage. As will be described in more detail below, the present invention achieves these and other desirable results.

BRIEF SUMMARY OF THE INVENTION

In one embodiment, the present invention relates to a computer implemented method for protecting a non-volatile storage element from unauthorized write accesses. This method initially involves the computer system entering into a mode of operation where an authentication process is performed. Next, the security circuit of the computer system is placed in a first predetermined state before leaving the mode of operation. Then, the state of the security circuit is checked in which the operations of the computer system are halted if the security circuit exists in a state other than the first predetermined state.

BRIEF DESCRIPTION OF DRAWINGS

The present invention will be described by way of exemplary embodiments illustrated in the accompanying drawings which should not be construed to limit the scope of the present invention of which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without these specific details. In other instances, well known features are omitted or simplified in order not to obscure the present invention. Furthermore, for ease of understanding, certain method steps are delineated as separate steps, however, these separately delineated steps should not be construed as necessarily order dependent in their performance.

Herein, a number of terms and symbols are frequently used to describe certain hardware and characteristics. For example, the symbol "#" represents that a corresponding signal is active-low. The terms "activate", "deactivate", "active", "inactive" (and other tenses) are broadly defined as applying a particular voltage. For example, an active-low signal is activated when the signal represents a low voltage. In contrast, an active-high signal is activated when the signal has a high voltage. The term "attach" (and other tenses) may be broadly construed as mounting, connecting, integrating and/or encapsulating one element to another element. These "elements" may include integrated circuit devices, substrates, and the like. Finally, an "electronic system" includes any hardware equipment featuring electronics such as a computer.

Figure 1:
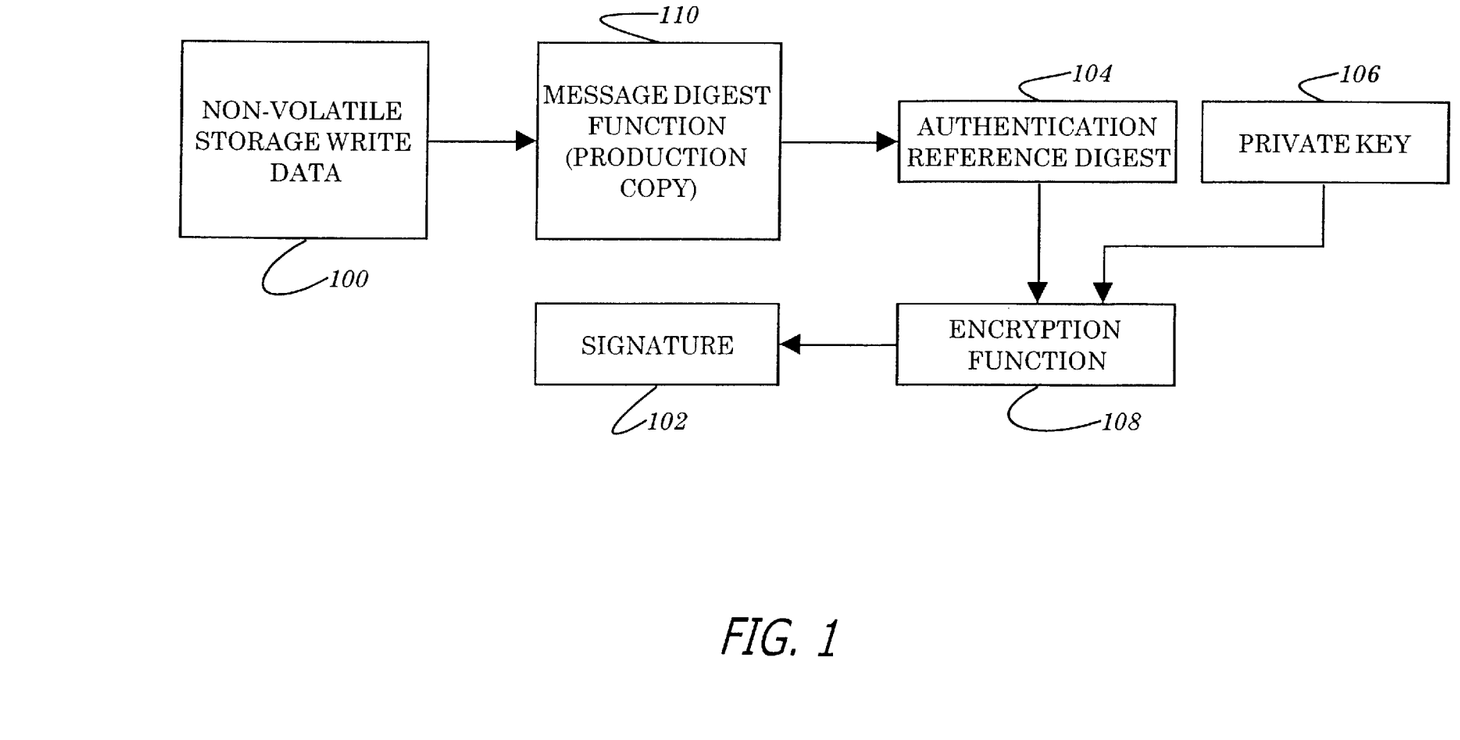
FIGS. 1–2 illustrate elements of the present invention, and their interrelationships with each other.
Figure 2:
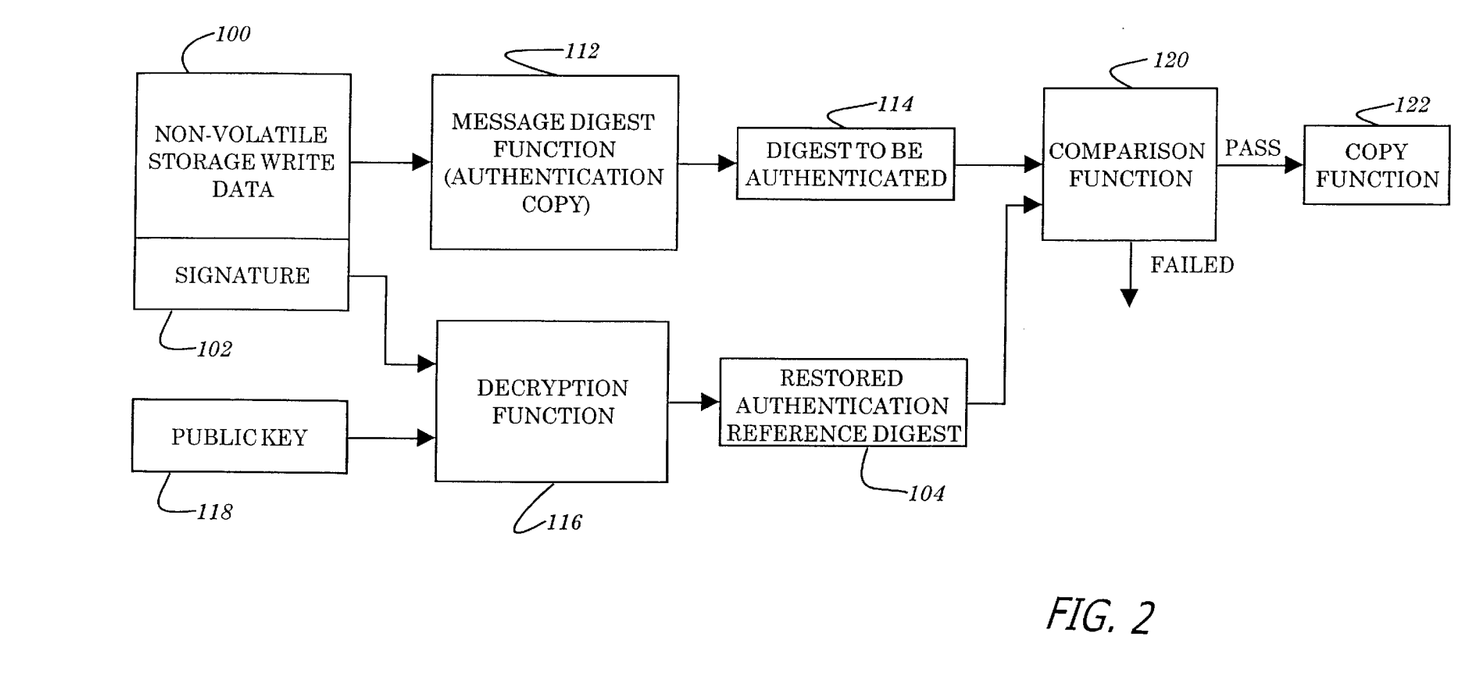

Referring now to FIGS. 1 and 2, two block diagrams illustrating the elements of the present invention and their interrelationships to each other are shown. As illustrated, a transferable unit of non-volatile storage write data 100 is provided with an electronic signature 102 to facilitate authenticating write data 100 prior to allowing write data 100 to be written into a non-volatile storage. Preferably, electronic signature 102 is "attached" to write data 100 so that electronic signature 102 accompanies work data 100. Examples of a transferable unit include a file, or a block, whereas examples of non-volatile storage include FLASH memory or erasable programmable read-only-memory (EPROM). Examples of write data is system basic input/output service (BIOS) updates featuring additions, deletions and other types of modifications. For many applications, it is expected that electronic signature 102 is generated and "attached" to write data 100 at the time write data 100 is created.

For the illustrated embodiment, electronic signature 102 is generated by encrypting a reference digest 104 with a secret private key 106 using an encryption function 108. The reference digest 104 is generated using a message digest function 110. In other words, the content of reference digest 104 is functionally dependent on the content of write data 100. Accordingly, the content of electronic signature 102 is also functionally dependent on the content of write data 100.

At write time, a secured corresponding copy of message digest function 112 generates a "new" digest 114 in real time. At the same time, a secured complementary decryption function 116 reconstitutes original reference digest 104 by decrypting electronic signature 102 using a secured complementary public key 118. The two digests 104 and 114 are provided to a secured comparison function 120 to determine if they are identical. The two digests 104 and 114 are identical if the encryption/decryption are complementary and write data 100 is authentic since both digests 104 and 114 are functionally dependent on the contents of write data 100 used to generate copies of the same message digest function 110 and 112. If the two digests 104 and 114 compared successfully, a secured copy function 122 is notified to perform the actual writing into the protected non-volatile storage; otherwise, the write data is rejected.

Encryption and decryption functions 108 and 116 may implement any one of a number of private/public key encryption/decryption techniques known in the art. Similarly, message digest function 110 and 112 may also implement any one of a number of message digest techniques known in the art. For further information on private/public key encryption/decryption techniques, see U.S. Pat. No. 4,218,582 entitled "Public Key Cryptographic Apparatus and Method;" U.S. Pat. No. 4,405,829 entitled "Cryptographic Communications System and Method;" U.S. Pat. No. 4,995,082 entitled "Method for Identifying Subscribers and for Generating and Verifying Electronic Signatures in a Data Exchange System;" and a publication entitled "The MD5 Message Digest Algorithm, Request For Comment," (RFC) 1321, April 1992.

Creation of electronic signature 102 and associating it with write data 100 (as described above), may be practiced in any number of computer systems known in the art, provided they are equipped to store and execute message digest function 110 and encryption function 108. It is anticipated that the creation of electronic signature 102 normally is practiced on the same computer system where write data 100 is created. For example, for the above mentioned system BIOS update application, it is anticipated that the system BIOS updates and electronic signature 102 will be generated and associated at the same time and on the same computer system. However, it is possible to create electronic signature 102 through multiple computer systems.

Figure 3:
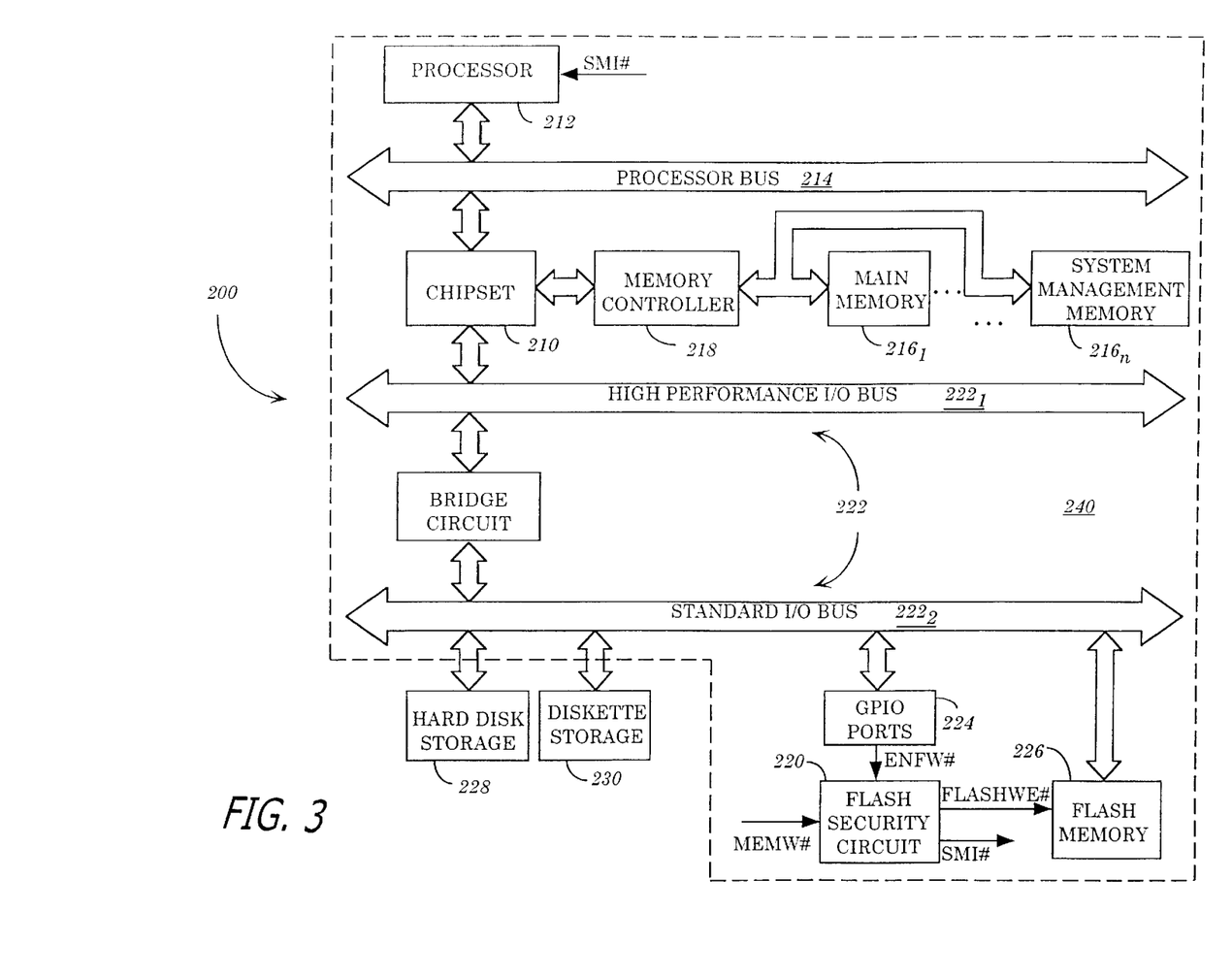
FIG. 3 illustrates an exemplary computer system incorporated with the teachings of the present invention on securing the authentication functions.

FIG. 3 illustrates an exemplary computer system 200 incorporated with the teachings of the present invention on authenticating write data before allowing the write data to be written into a protected non-volatile storage. Exemplary computer system 200 includes a chipset 210 connected to a processor 212 via a processor bus 214 and to one or more memory units $216_1$–$216_n$ via a memory controller 218 implemented either within chipset 210 or as a separate element (as shown). The chipset 210 operates to format and route information to different areas throughout computer system 200. The memory units $216_1$–$216_n$ ("n" is a positive whole number) may include main memory $216_1$ and system management memory $216_n$. These memory units $216_1$–$216_n$ may be different memory elements or the same memory element addressed at different locations.

In accordance to the present invention, exemplary computer system 200 further includes a FLASH security circuit 220 connected to a bus 222, general purpose input/output (GPIO) ports 224 and FLASH memory 226. Bus 222 may include a high performance input/output (I/O) bus $222_1$ (e.g., Peripheral Component Interconnected "PCI" bus) and/or a standard I/O bus $222_2$ (e.g., Industry Standard Architecture "ISA" bus). If multiple buses are used, the buses $222_1$ and $222_2$ may be connected by another bridge circuit as shown. It is contemplated that FLASH security circuitry 220 may be adapted for connection to bus $222_1$ or bus $222_2$ as shown herein.

For the illustrated embodiment, buses 214 and 222 are disposed on a substrate 240. The substrate 240 may include any type of circuit board (e.g., motherboard, daughter card, etc.) or a smart card. Elements 212, $216_1$–$216_n$, 218, 224 and 222 ($222_1$ and/or $222_2$) are either removably interconnected to substrate 240 via sockets (not shown) or "soldered" onto substrate 240. It is contemplated, however, that the invention may be integrated into a chipset or an application specific integrated circuit (ASIC), or perhaps even conventional "glue logic."

Processor 212 performs the conventional function of executing code. Processor 212 is equipped to execute code in multiple modes including a system management mode (SMM). Processor 212 is also equipped to respond to a wide variety of interrupts including a system management interrupt (SMI), which places processor 212 in SMM. Memory controller 218 and volatile memory units $216_1$–$216_n$ perform the conventional functions of controlling memory access and of providing execution time storage, respectively. In particular, for each write access to memory, memory controller 218 generates a memory write (MEMW#) signal for the addressed memory unit. Memory controller 218 normally does not map system management memory $216_n$ as part of the normal system memory space. System management memory $216_n$ is mapped into the system memory space, when processor 212 enters SMM. Furthermore, except for system initialization, processor mode transition, and execution in SMM, system management memory $216_n$ is write disabled.

FLASH memory 226 performs its conventional function of providing non-volatile storage. In particular, FLASH memory 226 stores system BIOS. During system initialization, the bulk of the system BIOS that is not security sensitive is loaded into main memory $216_1$, whereas the remaining system BIOS (including in particular the write data authentication functions) that is security sensitive is loaded into system management memory $216_n$. Flash security circuit 220 protects FLASH memory 226 from unauthorized write accesses by keeping FLASH memory 226 write disabled. Flash security circuit 220 also authenticates the write data, whenever it enables FLASH memory 226 for a write access, by generating SMI to invoke the secured system BIOS write data authentication functions in system management memory $216_n$.

GPIO ports 224 also perform their conventional functions for providing I/O ports to a variety of peripherals. In particular, one of the I/O ports is used to notify FLASH security circuit 220 of a write request to FLASH memory 226. The write request is denoted by writing to a corresponding register of the I/O port using a standard I/O instruction of exemplary computer system 200.

Hard disk storage 228 also performs the conventional function of providing non-volatile storage. In particular, hard disk storage 228 stores operating system of exemplary computer system 200. During system initialization, operating system is loaded into main memory $216_1$. All other elements perform their conventional function known in the art. Except for the particularized functions and/or requirements, all enumerated elements are intended to represent a broad category of these elements found in computer systems.

Figure 4:
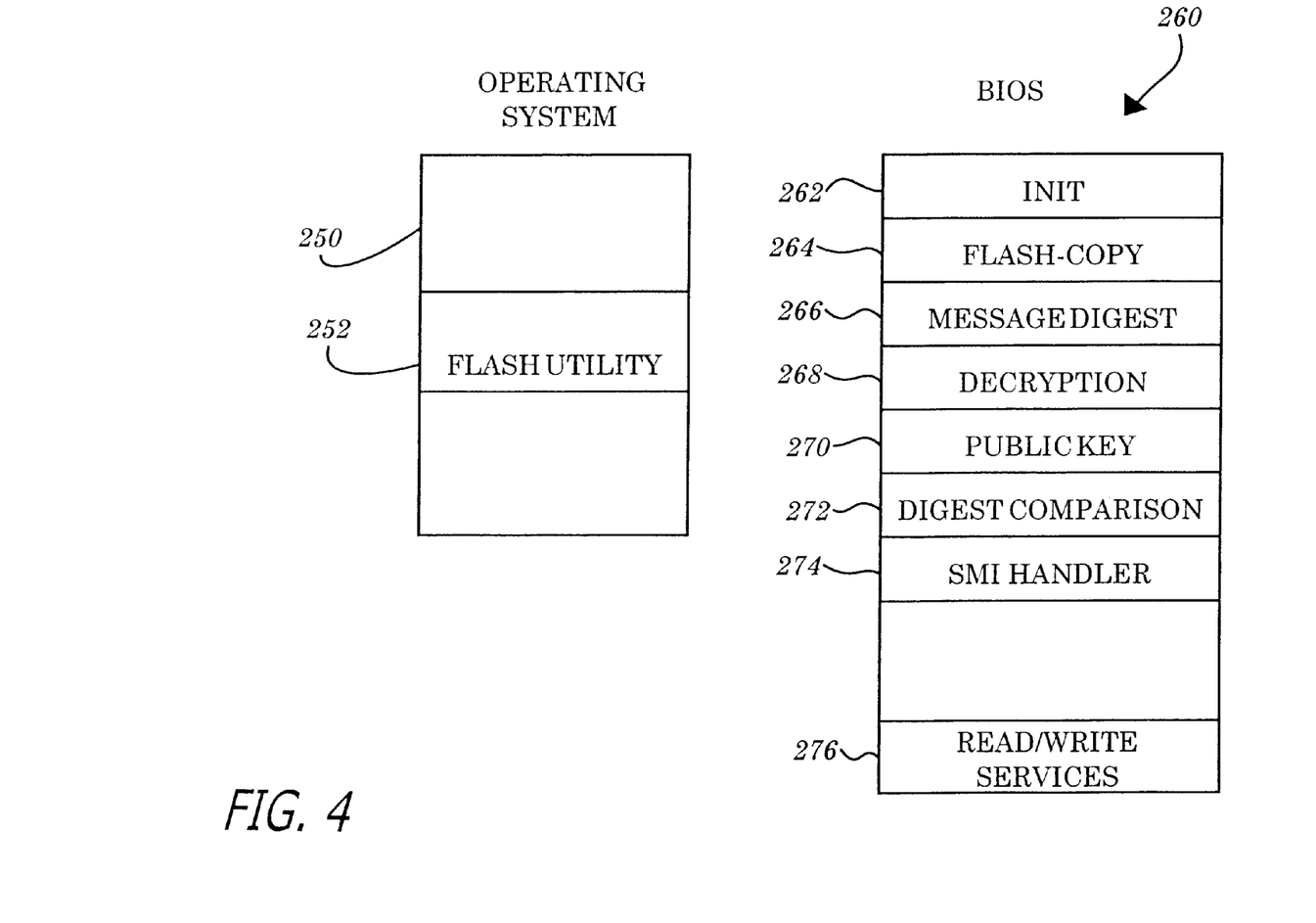
FIG. 4 illustrates the system BIOS, and for one embodiment, the operating system of the exemplary computer system in further detail.

FIG. 4 illustrates system BIOS and operating system of exemplary computer system 200 in further detail. As shown, system BIOS 260 includes an INIT function 262, a FLASH copy utility 264, a message digest function 266, a decryption function 268, a public key 270, a digest comparison function 272, a SMI handler 274 and read/write service 276, whereas, for some embodiments, operating system 250 includes a FLASH utility 252.

INIT function 262 initializes system BIOS 260 during system initialization, including loading FLASH copy utility 264, message digest function 266, decryption function 268, public key 270, digest comparison function 272, and SMI handler 274 into system management memory $216_n$. As described earlier, system management memory $216_n$ is normally not mapped into system management space, unless a SMI is triggered placing processor 212 in SMM, and system management memory $216_n$ is write disabled except for initialization, processor mode transition, and execution in SMM. Accordingly, these system BIOS functions are secured from malicious modification.

SMI handler 274 services SMIs, invoking other functions (including the write data authentication functions) as necessary, depending on the cause of a particular SMI. As will be described in more detail below, SMI handler 274 is given control upon entry into SMM. As described earlier, message digest 266 generates a digest in real time for the write data of a FLASH write request, in accordance to the content of the write data, and decryption function 268 decrypts the electronic signature attached to the write data of the FLASH write request using public key 270 in order to reconstitute the FLASH write data's original digest. Digest comparison function 272 compares the two digests, and finally FLASH copy utility 264 performs the actual writing of the authenticated data into FLASH memory 226. Message digest function 266, decryption function 268, digest comparison function 272, and FLASH copy utility 264 are invoked in due course by SMI handler 274 upon determining that a SMI is triggered by FLASH security circuitry 226.

Read/Write services 276 provides read and write services to I/O devices. Read/Write services 276 are among the bulk of the BIOS functions that are loaded into main memory $216_1$ during system start up.

For some embodiments, FLASH utility 252 is included to perform various FLASH related functions including in particular copying of FLASH write data from an external source medium to a buffer in main memory $216_1$, and then copying the FLASH write data from the buffer into FLASH memory 226 by way of read/write services 276. Read/write services 276 invoke message digest function 266, decryption function 268 and the like to validate the FLASH write data, and if validated, FLASH copy utility 264 performs the actual writing which is described more fully below. Examples of such FLASH write data are system BIOS additions, deletions, and modifications described earlier, and an example of an external source medium is a diskette.

Figure 5:
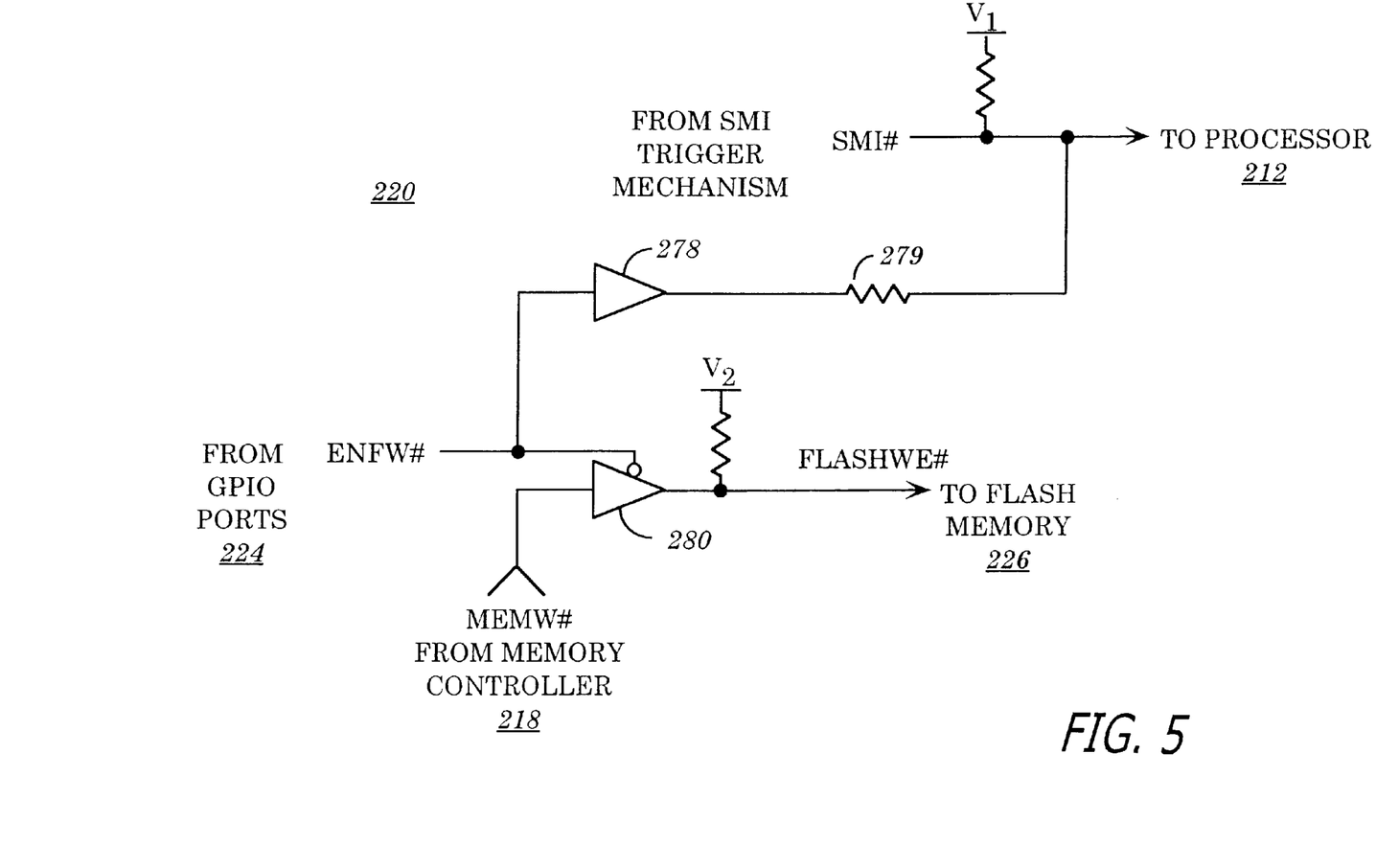
FIG. 5 illustrates one embodiment of the FLASH security circuit of FIG. 3 in further detail.

FIG. 5 illustrates FLASH security circuit 220 in further detail. As shown, FLASH security circuit 220 includes first and second drivers 278 and 280. The enable flash write (ENFW#) input of first driver 278 is provided by one of the I/O ports of GPIO ports 224, whereas the output of first driver 278 is coupled to a signal line having a series resistor 279 coupling a SMI trigger mechanism to processor 212. Thus, whenever GPIO ports 224 activates ENFW# to enable write access, usually in response to a FLASH write request, first driver 278 causes a SMI to be triggered for processor 212. The active ENFW# signal pulls down the signal line to the processor 212 of FIG. 3 from voltage $V_1$ (e.g., approximately 3.3 volts) to the active (low) ENFW#.

The inputs (ENFW# and MEMW#) of second driver 280 are provided by the same I/O port of GPIO ports 224 and memory controller 218 respectively, whereas a flash write enable (FLASHWE#) output of second driver 280 is provided to FLASH memory 226. FLASHWE# is tri-stated. FLASHWE# becomes active (low), when both MEMW# and ENFW# are active in order to counteract the effects of pull-up resister of a selected voltage $V_2$ (e.g., approximately 5 volts) of FIG. 1. In other words, MEMW# from memory controller 218 is qualified by ENFW#, which also causes a SMI to be triggered through first driver 278. Thus, the secured authentication functions stored in system management memory $216_n$ would be invoked to authenticate the write data before allowing them to be written into FLASH memory 226.

To increase security of the overall authentication process, a test scheme is performed to detect whether the non-volatile storage protection circuit 220 has been tampered with or circumvented. One way to tamper with the non-volatile storage protection circuit is to remove series resistor 279 in order to prevent the authentication system from being invoked. In essence, disconnecting the signal line from first driver 278 prevents the SMI# line from being activated (low). Therefore, as shown in FIG. 6, the security is protected through the process described herein.

Figure 6:
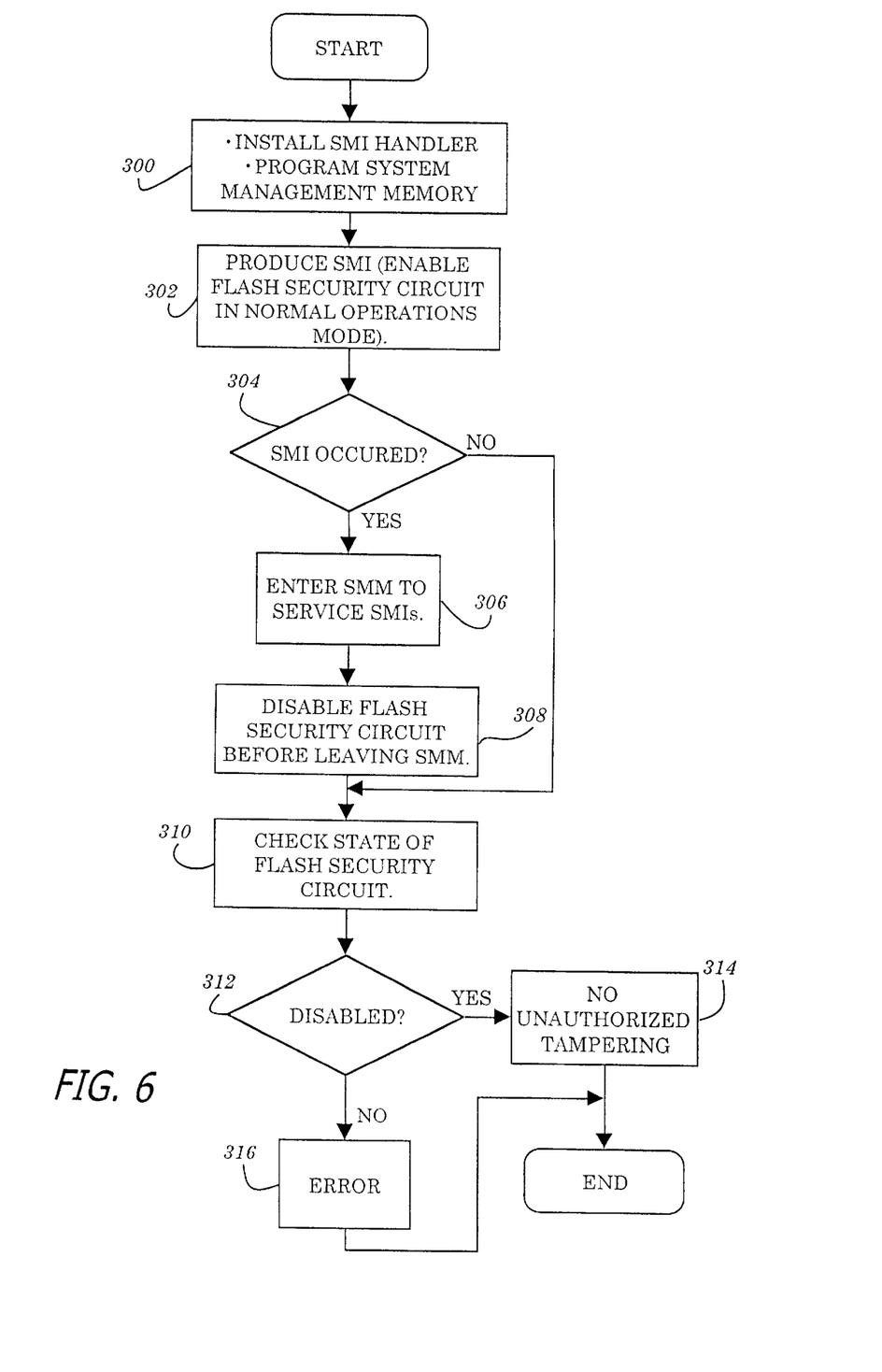
FIG. 6 illustrates operational flow of a test performed prior to loading of BIOS information from flash memory.

FIG. 6 illustrates one embodiment of testing for proper operation of the FLASH security circuitry 220. Initially, a mechanism to handle SMIs is implemented with the computer system 200 by installing the SM handler 274 and programming the system management memory address (Step 300). In normal operation mode, FLASH security circuit 220 is enabled by setting an I/O bit (Step 302). The setting of the I/O bit causes the ENFW# signal to be asserted and the SMI# to be generated. Flash security circuit 220 of FIG. 5 is enabled during normal operations mode because SMIs are not recognized during SMM.

Thereafter, a check may be made to determine whether FLASH security circuit 220 has produced a SMI (Step 304). This may be performed by power-on self test (POST) code checking the state of ENFW#. If not, an error condition may occur in which FLASH security circuit 220 of FIG. 5 has failed or the circuit has been tampered (Step 310). Upon detecting an active SMI#, the computer system 200 enters SMM to service the interrupt "SMI" (Step 306). Before leaving SMM, the I/O bit associated with FLASH security circuit 220 of FIG. 5 is disabled (Step 308).

Subsequently, the state of FLASH security circuit 220 of FIG. 5 is checked (Step 310). If the FLASH security circuit is disabled, no unauthorized tampering has been detected (Steps 312 and 314). However, if the FLASH security circuit is still enabled or no SMI occurred, then the BIOS will halt computer system because an error occurred in that FLASH security circuit has either failed or been tampered (Step 316). The reason is that if FLASH security circuit 220 of FIG. 5 has been tampered by disconnecting signal line from first driver 278 prior to assertion of ENFW#, no SMI will be asserted. Likewise, if the SMI is not generated, the FLASH security circuit 220 of FIG. 5 will be left enabled indicating a failure.

Figure 7:
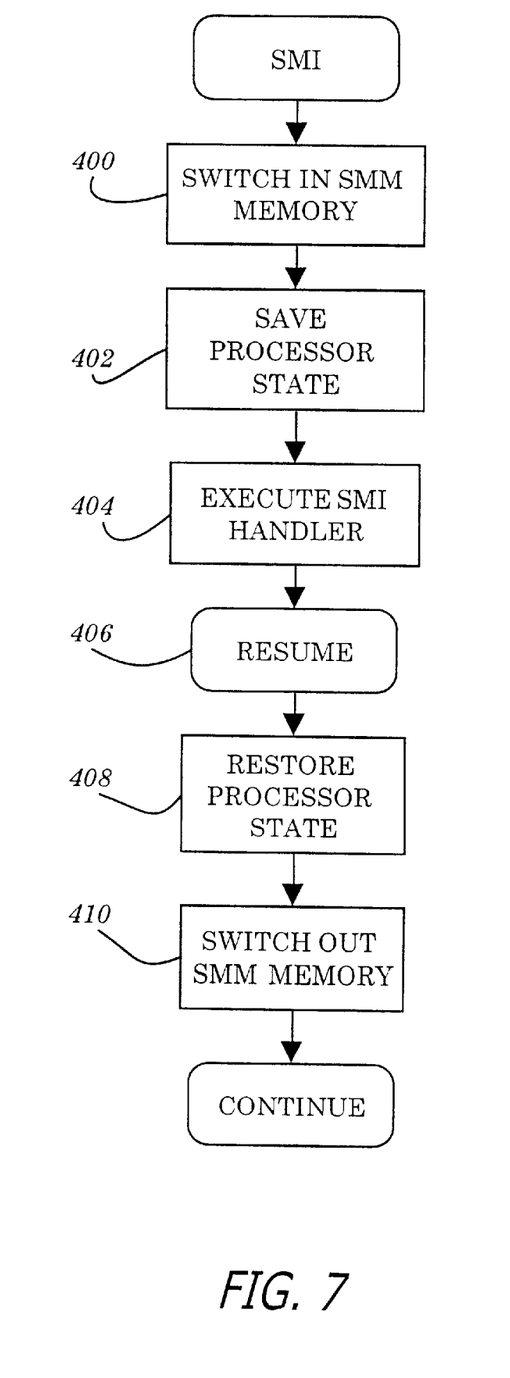
FIG. 7 illustrates execution flow of the exemplary computer system under a system management mode.

FIG. 7 illustrates execution flow of the exemplary computer system in SMM. As shown in combination with the computer system 200 of FIG. 3, upon detection of an SMI, processor 212 directs memory controller 218 to switch in and map system management memory $216_n$ as part of the system memory space, and in response, memory controller 218 performs the requested switching and mapping accordingly (Step 400). Next, processor 212 saves the processor state into system management memory $216_n$ (Step 402). Upon saving the processor state, processor 212 transfers execution control to pre-stored SMI handler 274 (Step 404).

SMI handler 274 then determines the cause of the SMI and services the SMI accordingly, invoking other routines such as the authentication functions as necessary. Upon servicing the SMI, SMI handler 274 executes a Resume instruction to transfer execution control back to the interrupted programs (Step 406). In response, processor 212 restores the saved processor state from system management memory $216_n$ (Step 408). Furthermore, processor 212 directs memory controller 218 to unmap system management memory $216_n$ from the system memory space and switch out system management memory $216_n$. In response, memory controller 218 performs the requested unmapping and switching accordingly (Step 410).

As a result, the SMI is serviced in a manner that is transparent to the executing operating system, subsystems as well as applications. In other words, an SMI is a transparent system service interrupt.

Figure 8:
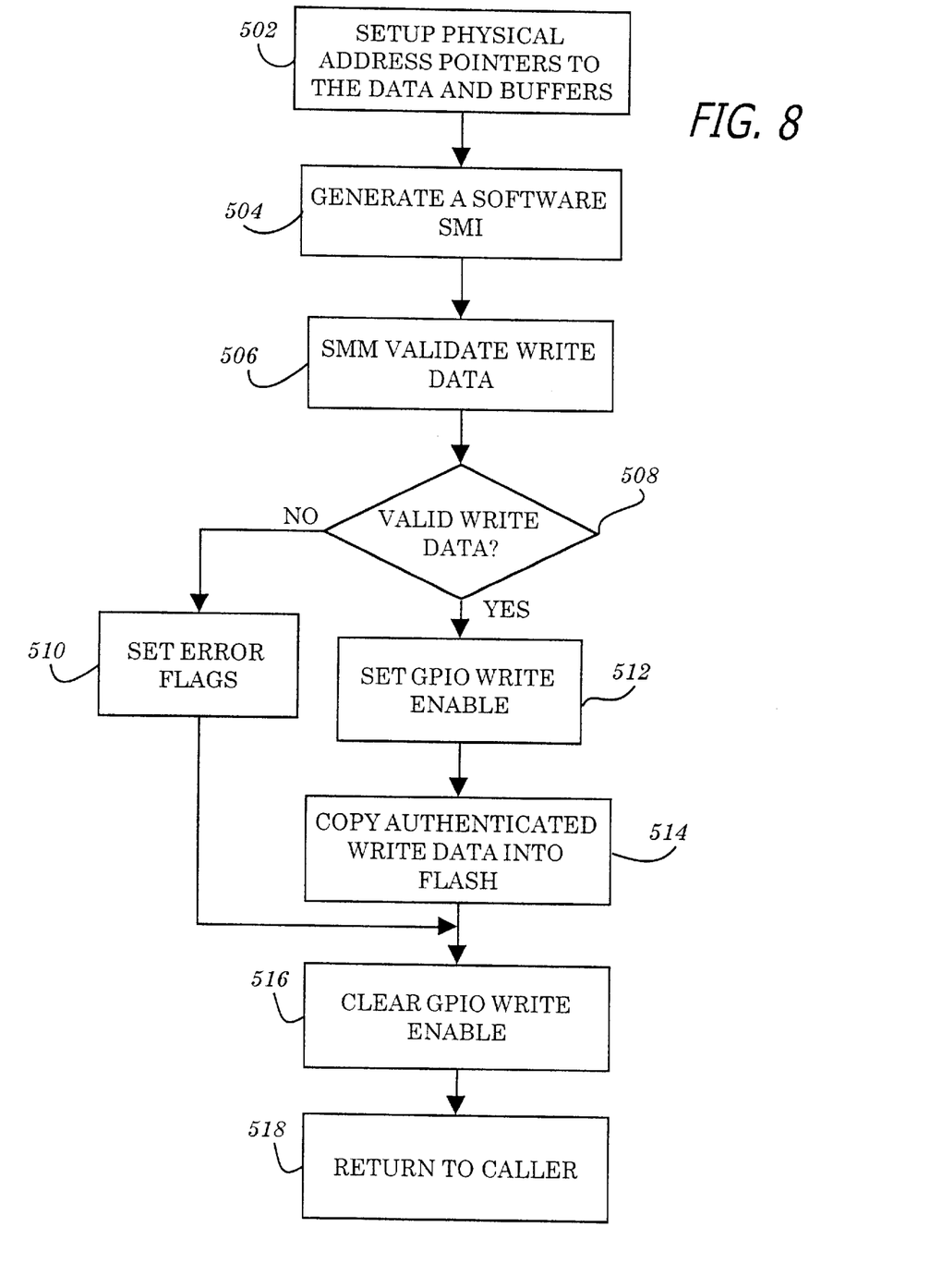
FIG. 8 illustrates one embodiment of the execution flow for writing into FLASH memory.

FIG. 8 illustrates one embodiment of the execution flow for writing data into FLASH memory 226 of FIG. 3. As shown herein and in combination with FIGS. 3 and 4, in response to a write request from an application, such as FLASH utility 252 described earlier, read/write services 276 set up the physical address pointers to the write data (Step 502). Next, for the illustrated embodiment, read/write services 276 generate a software SMI to enter SMM and to provide the SMI handler with the physical address pointers of the write data (Step 504). A software SMI is used and preferred at this point in time as opposed to the designated GPIO port 224 because FLASH memory would remain disabled during the authentication process.

Upon entry into SMM, as described earlier, SMI handler 274 is given control. Upon ascertaining the reason for the SMI, SMI handler 274 invokes message digest 266 and decryption function 268 to authenticate the write data identified by the physical address pointers (Step 506). If the write data fails the authentication process (Step 508), SMI handler 274 sets the appropriate error flags (Step 510), clears the designated GPIO port (Step 516), and exits SMM (Step 518). Upon given control again, read/write services 276 returns to the caller, after performing the necessary "clean ups".

On the other hand, if the write data passes the authentication process at Step 508, SMI handler 274 enables write to FLASH memory 226 of FIG. 5 by setting the designated GPIO port 224 (Step 512). Once enabled, the authenticated write data is copied into FLASH memory 226 of FIG. 5 (Step 514). After all authenticated write data have been copied, as described earlier, SMI handler 274 of FIG. 5 clears the designated GPIO port 224, and exits SMM (Step 516). Upon given control again, read/write services 276 returns to the caller, after performing the necessary "clean ups".

As described earlier, when SMI handler 274 enables write to FLASH memory 226 by way of the designated GPIO port, in addition to enabling FLASH memory 226 for write, a SMI is triggered. However, since this "new" SMI is triggered while the system is in SMM, the "new" SMI is discarded. The reason why the "new" SMI is triggered is because for the illustrated embodiment, the designated GPIO port 224 may be set outside SMM. The "automatic" SMI will ensure that the write data will be authenticated in the event that happens, preventing any possibility of bypassing the authentication process.

Thus, methods and apparatus for preventing unauthorized access to a protected non-volatile memory have been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. In a computer system including a non-volatile storage element access protected by a security circuit, a computer implemented method for protecting the non-volatile storage element from an unauthorized write access comprising:

a) entering into a mode of operation by the computer system in which an authentication process is performed, the mode of operation being a system management mode;

b) placing the security circuit in a first predetermined state of operation before leaving the mode of operation;

c) checking a state of the security circuit; and d) halting further operations of the computer system if the security circuit exists in a state of operation other than the first predetermined state of operation.

2. The method of claim 1, wherein prior to the entering into the mode of operation, the method comprises:

providing an active signal to place the security circuit in a second predetermined state of operation in order to generate an interrupt, the interrupt causing the computer system to enter the mode of operation.

3. The method of claim 2, wherein the providing of the active signal includes:

receiving an enable flash write signal by the security circuit;

pulling an interrupt line to a predetermined voltage in response to the enable flash write signal in order to generate the interrupt; and enabling a driver to produce an active flash write enable signal upon receiving an active memory write signal.

4. The method of claim 2, wherein the interrupt is a system management interrupt.

5. The method of claim 3, wherein the security circuit includes a plurality of drivers including a first driver having an input receiving a memory write signal and a control input receiving an enable flash write signal, the first driver outputting the memory write signal when the enable memory write signal is activated.

6. The method of claim 5, wherein the checking of the state of the security circuit includes determining whether (i) the enable flash write signal is active indicating that the security circuit operates in the second predetermnined state or (ii) the enable flash write signal is inactive indicating the security circuit operates in the first predetermined state.

7. In a computer system including a protected non-volatile storage, a computer implemented method for protecting the non-volatile storage from an unauthorized write access, the method comprising:

a) providing an interrupt to invoke an authentication process and to place a security circuit associated with the non-volatile storage in a first state;

b) entering a mode of operation in which the authentication process is performed;

c) placing the security circuit in a second state before leaving the mode of operation;

d) checking a state of the security circuit; and e) halting further operations of the computer system if the security circuit is in the first state.

8. A system comprising:

(a) a substrate;

(b) a memory storage unit attached to the substrate;

(c) a security circuit including at least one resistor and at least one driver attached to the substrate and connected to the memory storage unit, the security circuit placed in a first state before conducting an authentication function; and (d) system basic input/output service (BIOS) stored in the memory storage unit, the BIOS including a plurality of authentication functions to determine a state of the security circuit and to authenticate the data to be written into the memory storage unit, the BIOS to disable the system if the security circuit failed to transition from the first state to a second state.

9. The system according to claim 8, wherein the substrate is a motherboard.

10. The system according to claim 8, wherein the substrate is a daughter card.

11. The system according to claim 8, wherein the substrate is a removable smart card.

12. The system according to claim 8, wherein the substrate is a chipset.

13. The system according to claim 8, wherein the substrate is an application specific integrated circuit.

14. The system according to claim 8, wherein the memory storage unit is a non-volatile memory.

15. The system according to claim 14, wherein the security circuit includes an enable memory write signal line;

a memory write signal line;

a first driver unit including an input connected to the enable memory write signal line and an output connected to both an interrupt signal line and a control input of a second driver unit; and the second driver unit including an input connected to the memory write signal line, the control input connected to the enable memory write signal line and an output connected to a memory write enable signal line of a non-volatile memory storage unit.

* * * * *